United States Patent

[11] 3,562,421

[72] Inventors Irving Moskovitz
Roslyn Heights;
Yoshiharu Daitoku, Northport, N.Y.

[21] Appl No 658,174
[22] Filed Aug. 3, 1967
[45] Patented Feb. 9, 1971

[73] Assignee Ward Electronic Industries
a corporation of New Jersey, by mesne assignments to

[54] TELEVISION TIME MULTIPLEXING SYSTEM
6 Claims, 7 Drawing Figs.

[52] U.S. Cl. .......... 178/6.8, 178/6; 179/15
[51] Int. Cl. .......... H04m 7/08, H04j 3/06
[50] Field of Search .......... 178/6TM, 6FM, 5.2, 5.4; 179/15A; 307/241, 243, 256, 259; 329/50, 147

[56] References Cited

UNITED STATES PATENTS

| | | | |
|---|---|---|---|
| 2,535,471 | 12/1950 | White et al. | 179/7.1 |
| 2,653,186 | 9/1953 | Hurford | 178/7.1 |
| 2,677,721 | 5/1954 | Bedford | 179/15A |
| 2,696,523 | 12/1954 | Theile | 178/6FM |
| 2,898,399 | 8/1959 | Hinsdale Jr. et al. | 178/69.5CB |
| 2,577,368 | 12/1951 | Schultz et al. | 178/5.4 |

*Primary Examiner*—Richard Murray
*Assistant Examiner*—Donald E. Stout
*Attorney*—Bernard Malina

ABSTRACT: Described is apparatus for transmitting a plurality of black and white television video signals over a single cable, or on a single carrier frequency, to separate receivers. This is accomplished by means of time-sharing multiplexing techniques wherein a frequency burst on the video blanking pulse, similar to a color burst used in color television systems, is utilized at the receiving end of the system for demodulating or separating the two multiplexed video signals.

INVENTORS.
IRVING MOSKOVITZ and
YOSHIHARU DAITOKU
By Murray & Linkhauer
Attorneys INVENTORS.
IRVING MOSKOVITZ and
YOSHIHARU DAITOKU
By Murray & Linkhauer
Attorneys INVENTORS.
IRVING MOSKOVITZ and
YOSHIHARU DAITOKU
By Murray & Linkhauer
Attorneys

TELEVISION TIME MULTIPLEXING SYSTEM

BACKGROUND OF THE INVENTION

In the usual television-transmitting system, a single video signal is transmitted to a remote receiver on a single conductor or carrier frequency. Indeed, this is all that is required in conventional television broadcasting wherein each station, assigned a specific channel or carrier frequency, transmits a single video signal.

There are, however, certain applications where it is desired to transmit a plurality of video signals over a single conductor or on a single carrier frequency. In educational television programs and closed circuit television systems, for example, it is often necessary to televise two separate programs at one location and transmit them to two separate receivers at another location. With conventional systems, this requires two separate cables or two separate carrier frequencies (i.e., channels).

SUMMARY OF THE INVENTION

As an overall object, the present invention seeks to provide a means for transmitting a plurality of black and white television signals over a single conductor, or on a single carrier frequency, to separate receivers at a remote location.

More specifically, an object of the invention is to provide means for transmitting a plurality of black and white television signals over a single conductor or carrier frequency by means of time-sharing multiplex techniques.

Still another object of the invention is to provide a system of the type described in which a multiplexed signal at the receiving end of the system is separated into two separate video components by means of a demodulator controlled by a keyed oscillator driven by a frequency burst on the blanking pulses of the transmitted signal.

In accordance with the invention, a television multiplexing system is provided comprising first camera means for generating a first television video signal, second camera means for generating a second television video signal, means for time division multiplexing said first and second video signals to produce a composite pulsed multiplexed signal wherein alternate pulses represent samples of the first and second video signals, means for transmitting said composite multiplexed signal to a remote location on a single carrier medium, and means at the remote location for separating those pulses in the multiplexed signal representing samples of the first video signal from those representing the second video signal.

The aforesaid two cameras are both controlled by the same blanking and sync pulses such that the horizontal sweep cycles of the two video signals are in phase. These two video signals are then applied to a switch or multiplexer which alternately connects one and then the other of the video signals to a common transmission line. At the receiving terminal, the incoming multiplexed signal or sampling pulses must be switched in equivalent sequence in order to separate one from the other. Furthermore, this switching action must be in exact synchronism with that at the transmitting end of the system to make certain that the two receivers at the receiving end will receive their properly assigned video samples. For this purpose, the output of the oscillator which drives the multiplexing switching apparatus at the transmitter is also applied as a short frequency burst to each blanking pulse in the transmitted video signal. In this respect, it corresponds somewhat to a color burst utilized in color television techniques. At the receiving end, then, this color burst is utilized to drive a keyed oscillator, the output of which is utilized in the switching or multiplexing equipment for separating those samples representing one video signal from those representing the other. In this manner, the switching action in the multiplexing equipment at the receiving end will be in exact synchronism with that at the transmitting end such that the proper pulse samples are recombined into two distinct video signals.

As will be appreciated, the multiplex technique effectively blanks out or eliminates one-half of the original video signals; and it might be expected that this would produce a picture on the tube having vertical black lines and poor resolution. However, due to the conventional interlaced scanning techniques which are employed, the resolution of the picture is not seriously affected as will be explained more fully hereinafter.

The above and other objects and features of the invention will become apparent from the following detailed description taken in connection with the accompanying drawings which form a part of this specification, and in which.

Figure 1:
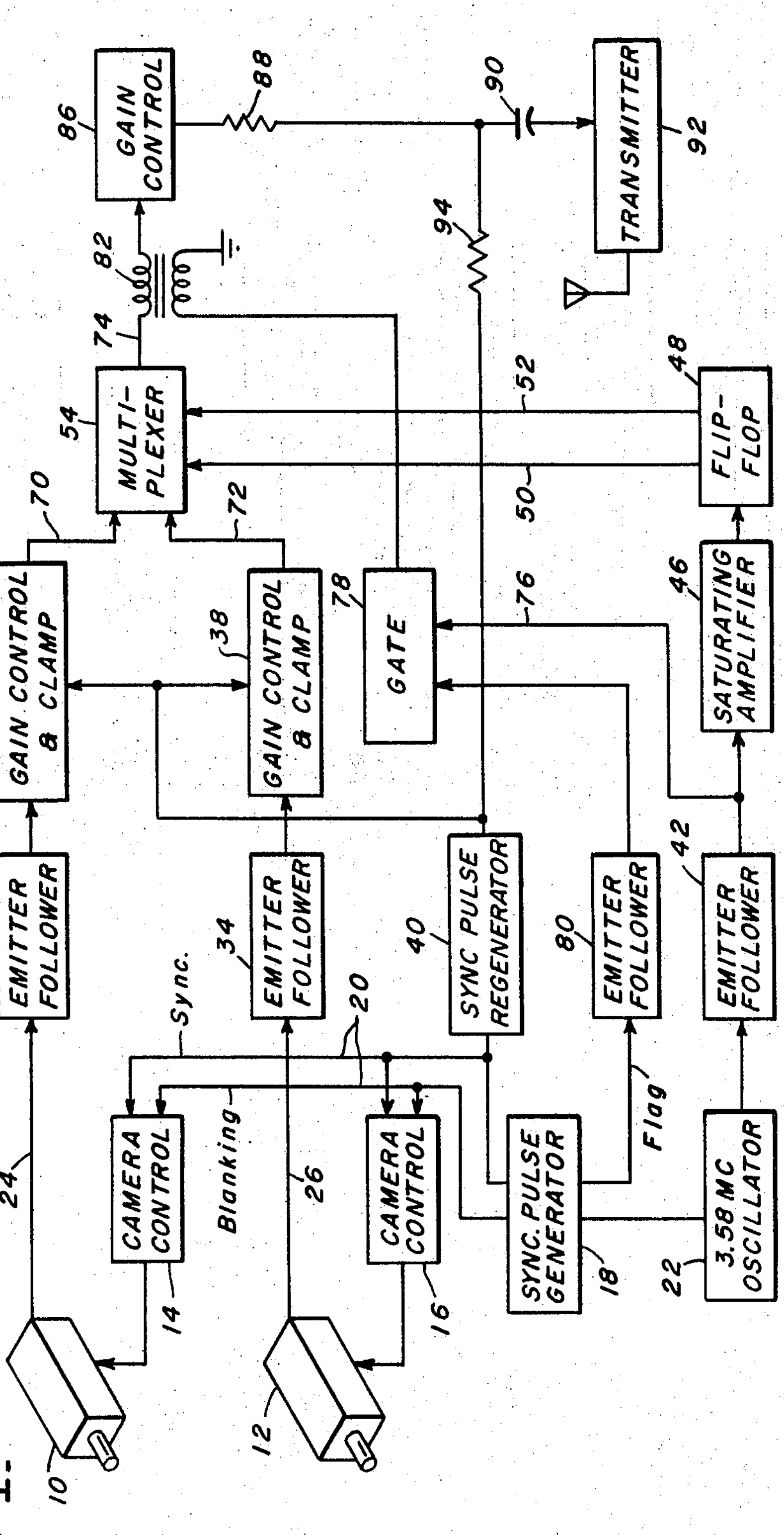
FIG. 1 is a schematic block diagram of the transmitting portion of the television multiplexing system of the invention.

With reference now to the drawings, and particularly to FIG. 1, two separate television cameras 10 and 12 are shown. Each camera 10 and 12 is provided with a separate camera control circuit 14 or 16; and each camera control circuit is supplied with sync and blanking pulses from a sync pulse generator 18 via leads 20. The sync pulse generator 18, in turn, is driven by a 3.58 megacycle oscillator 22 in accordance with conventional television-transmitting techniques.

Figure 5:
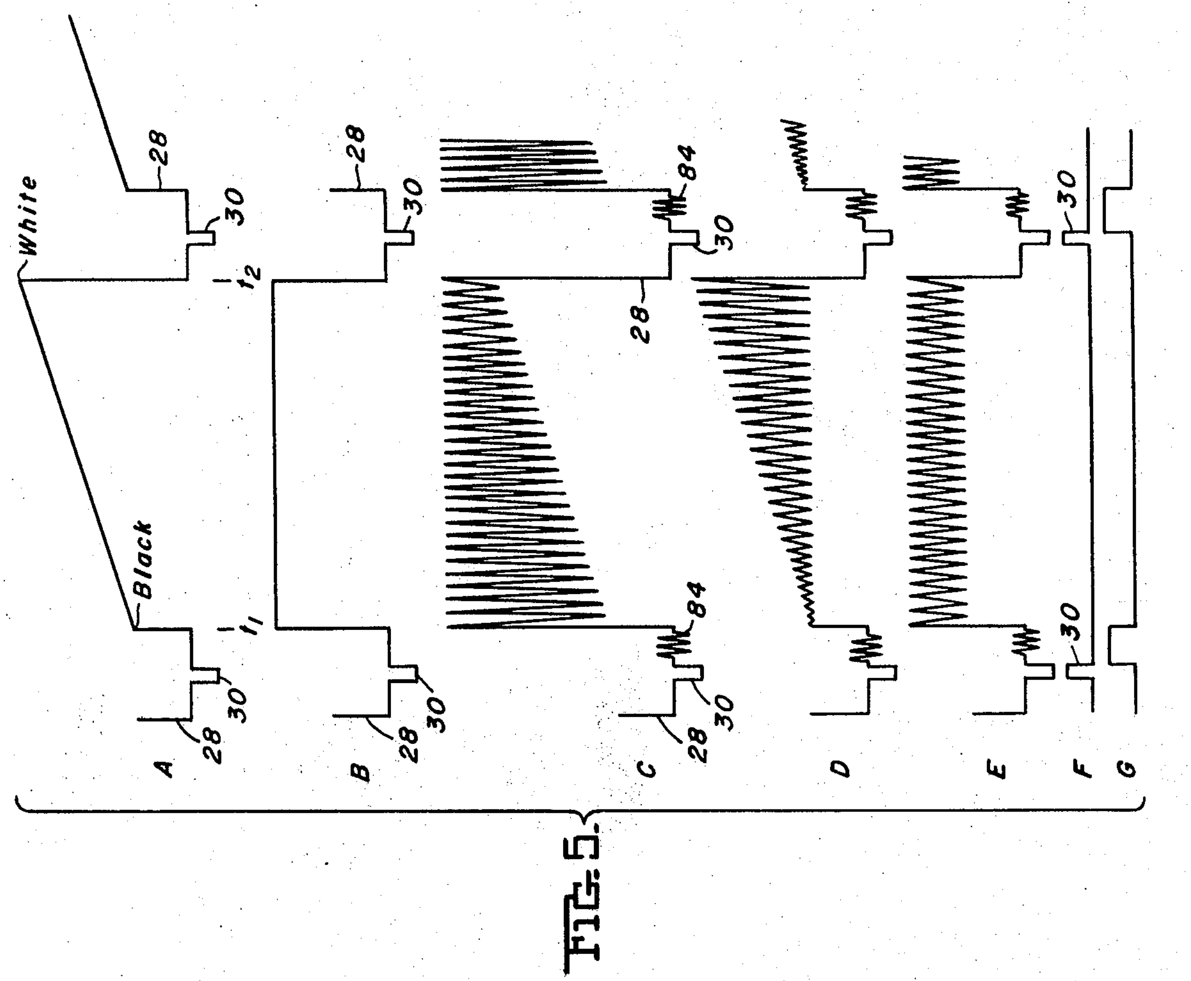
FIG. 5 illustrates waveforms appearing at various points in the circuits of FIGS. 1 and 3.

The output of the camera 10 is a video signal appearing on lead 24. Similarly, the output of the camera 12 is a second video signal appearing on lead 26. With reference to FIG. 5, waveforms A and B illustrate assumed video signals at the outputs of cameras 10 and 12, respectively. At the beginning of each horizontal scan cycle between times $t_1$ and $t_2$, a blanking pulse 28 is generated. Superimposed upon the blanking pulse 28 is a sync pulse 30. The black and white levels are indicated on waveform A by suitable legends. It can be seen, therefore, that as the electron beam of the camera 10 sweeps across one horizontal line, the light intensity gradually increases from black through the various shades of gray to white. On the other hand, the waveform B, comprising the output of camera 12, is at a constant level throughout the horizontal sweep, indicating a constant luminance value. The waveforms A and B, of course, are for purposes of illustration only, it being understood that in actual practice the video wave shape between the blanking pulses 28 will be much more complicated as where a composite picture is being viewed.

The video output signals comprising waveforms A and B of FIG. 5 are applied via leads 24 and 26 (FIG. 1) to emitter followers 32 and 34. The outputs of the emitter followers, in turn, are applied to two gated gain control and clamp circuits 36 and 38. The circuits 36 and 38 are gated or controlled by the output of a sync pulse regenerator 40 which, in turn, has the sync pulses at the output of generator 18 applied to its input. With the arrangement shown, the circuits 36 and 38 will be gated "ON" only during the occurrence of the sync pulses 30 as shown in FIG. 5. The gain control circuits clamp the maximum negative levels of the sync pulses 30 in both video waveforms A and B and, hence, insure that both video signals have the same reference voltage level. This is important in insuring proper time-sharing multiplexing without signal distortion.

As was mentioned above, the sync pulse generator 18 is driven by means of a 3.58 megacycle oscillator 22. The output of this oscillator is also applied through emitter follower 42 and a saturating amplifier 46 to a flip-flop circuit 48. As is known, the flip-flop circuit 48 is a type of multivibrator which will convert the essentially sine wave output of oscillator 22 into a square wave. The flip-flop 48 is provided with two electron valves, one of which is conducting while the other is cut off. By taking the outputs from the two electron valves on leads 50 and 52, the square wave on lead 50 will be 180° out of phase with that on lead 52 and each will have a frequency of 3.58 megacycles. These two square-wave signals, 180° out of phase, are applied to the multiplexer or diode switching circuit 54 to which the outputs of the gain control and clamp circuits 36 and 38 are also applied.

Figure 2:
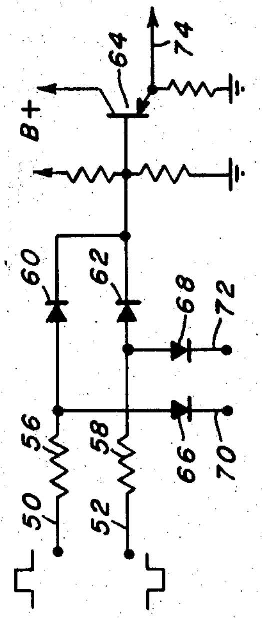
FIG. 2 is a detailed circuit diagram of the multiplexer of FIG. 1.

With reference, now, to FIG. 2, the multiplexer 54 is shown in detail. The signals on leads 50 and 52 comprising square waves which are 180° out of phase with respect to each other are applied through resistors 56 and 58 to the anodes of two diodes 60 and 62, respectively. The cathodes of the diodes 60 and 62 are both connected to the base of an emitter follower transistor 64. The anodes of the diodes 60 and 62 are connected to the anodes of a second pair of diodes 66 and 68, respectively, while the cathodes of diodes 66 and 68 are connected to the outputs of circuits 36 and 38 via leads 70 and 72.

It will be remembered that the signals on the leads 70 and 72 comprise waveforms A and B of FIG. 5. Those on leads 50 and 52, in turn, comprise 3.58 megacycle square wave signals 180° out of phase with respect to each other. DUring one-half cycle of the applied square wave, diodes 60 and 66 will be biased in the reverse direction while diodes 62 and 68 will be biased in the forward direction. Consequently, the video waveform B on lead 72 will now pass to the base of transistor 64 and appear at its emitter on lead 74. On the other half cycle, diodes 62 and 68 will be cut off while diodes 66 and 60 are conducting, whereby a portion of waveform A will appear at the emitter of transistor 64. Since the horizontal sweep frequency is about 15.7 kilocycles per second and the frequency of the square wave is 3.58 megacycles, something in the neighborhood of about 220 to 230 cycles of the square wave applied to leads 50 and 52 will occur during one horizontal sweep of the video waveform as shown by waveforms A and B. Consequently, each video waveform is divided up into approximately 220 to 230 discrete samples or pulses. When these are combined by the transistor 64, waveform C of FIG. 5 appears.

The output of the emitter follower 42 comprising a 3.58 megacycle sinusoidal signal is also applied via lead 76 to a gate circuit 78. The gate circuit 78, in turn, is controlled by means of a flag pulse from the sync generator 18 applied to the gate 78 through an emitter follower 80. The flag pulse at the output of emitter follower 80 follows the sync pulse 30 during each horizontal scan cycle of the video waveform. Furthermore, the flag pulse persists for a very short period of time, before the expiration of the blanking pulse 28. Hence, the gate 78 is open to apply, via coupling transformer 82 at the output of circuit 54, a frequency burst of 3.58 megacycles to each blanking pulse and identified by the reference numeral 84 on waveform C of FIG. 5. As will be seen, this enables demodulation or recovery of the sampled video waveforms A and B at the receiving end of the apparatus.

After having the frequency burst 84 added to the sync pulses 28, the waveform C of FIG. 5 is passed through gain control circuit 86 and thence through resistor 88 and capacitor 90 to a transmitter 92. The transmitter 92, of course, may be replaced by a single cable in the case of a closed circuit television system wherein the video signals are not impressed upon a carrier signal. Before application to the transmitter 92, however, the output of sync pulse generator 40, which is a pulse in synchronism with the pulses 30 shown in FIG. 5, is added to the waveform through resistor 94 to insure that the transmitted signal is provided with a sharply defined sync pulse.

Figures 3, 4:
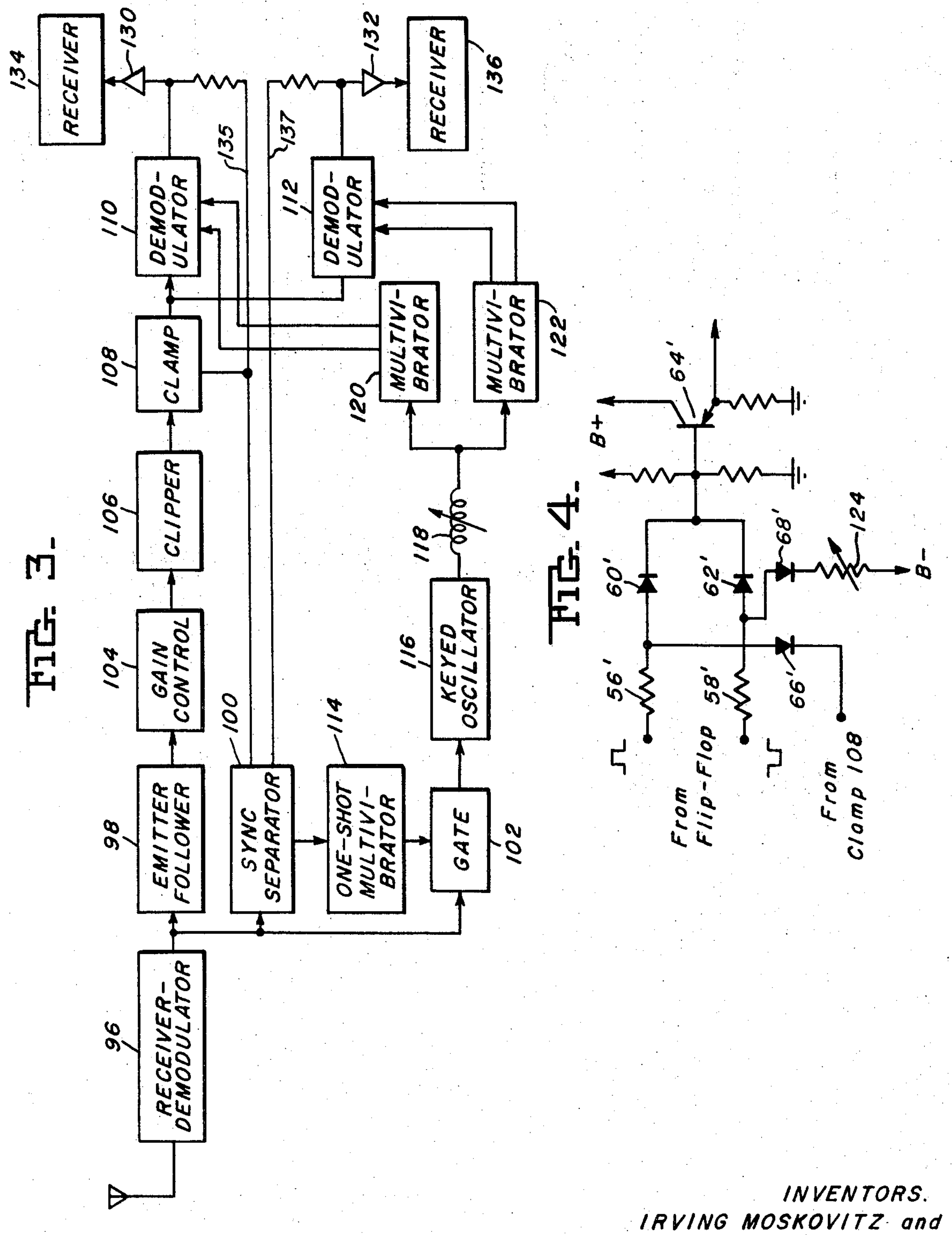
FIG. 3 is a schematic block diagram of the receiving portion of the invention.
FIG. 4 is a detailed schematic circuit diagram of the demodulators utilized in the receiving equipment shown in FIG. 3.

With reference, now, to FIG. 3, the receiving portion of the equipment is shown. The transmitted signal from the circuitry of FIG. 1, assuming that it is impressed upon a carrier signal, is detected and demodulated in a receiver-demodulator 96. The output of the receiver-demodulator, comprising the multiplexed signal illustrated as waveform C of FIG. 5, is applied to an emitter follower 98, a sync pulse separator 100 and a gate 102. The signal at the output of emitter follower 98 is applied through a gain control circuit 104, clipper 106 and clamp 108 to a pair of demodulators or pulse separators 110 and 112.

The output of the sync pulse separator, comprising the sync pulses 30, appears as waveform F in FIG. 5. These pulses are applied to the clamp 108 which, like clamps 36 and 38 of FIG. 1, is gate controlled. That is, the clamping action occurs only during occurrence of the sync pulses in the video wave shape; and the level to which the sync pulses are clamped determines the reference level for the entire video signal.

The output of the sync pulse separator 100 is also applied to a one-shot multivibrator 114, the output of which appears as waveform G in FIG. 5. The one-shot multivibrator 114 is controlled by the trailing edge of each of the sync pulses 30. As is known, a one-shot multivibrator will switch from the stable state to the unstable state in response to an input pulse and then switch back to its original stable state after a predetermined period of time. In this case, the width of each of the output pulses from the one-shot multivibrator is sufficient to encompass the frequency burst 84 on the waveform C of FIG. 5. Consequently, the only portions of the video waveform which pass through the gate 102 to a 3.58 megacycle keyed oscillator 116 are the frequency bursts 84. These frequency bursts, in turn, insure that the output frequency of the oscillator 116 is 3.58 megacycles and in phase with the square wave outputs of the flip-flop circuit 48 shown in FIG. 1. The output of the keyed oscillator 116 is applied through a variable inductor 118 which may be employed to adjust phase, if necessary, to a pair of bistable multivibrators 120 and 122. The outputs of the bistable multivibrators 120 and 122, like that of flip-flop 48, are square wave signals having a frequency of 3.58 megacycles and in phase with the square waves at the output of flip-flop 48. As will be seen, an exact phase relationship between the pulses at the outputs of bistable multivibrators 120 and 122 with those at the output of flip-flop 48 is an absolute necessity.

The details of the demodulators 110 and 112 are shown in FIG. 4, it being understood that both of the demodulators are identical in construction and that only one is shown in FIG. 4. It will be apparent that the demodulators are similar to the multiplexer shown in FIG. 2 and, accordingly, elements in FIG. 4 which correspond to elements of FIG. 2 are identified by like, primed, reference numerals. It will be assumed that the circuit shown in FIG. 4 comprises the demodulator 110. The two outputs of the bistable multivibrator 120, comprising square waves of 3.58 megacycles and 180° out of phase with respect to each other are applied through resistors 56' and 58' to the anodes of diodes 60' and 62'. The output of clamp 108 comprising waveform C of FIG. 5 is applied to the cathode of diode 66'; however the diode 68' is connected to a source of B− voltage through variable resistor 124.

The signals at the output of demodulators 110 and 112 appear as waveforms D and E in FIG. 5. It will be noted that these waveforms are similar to waveforms A and B except that during each horizontal sweep cycle, the video signal is broken up into discrete pulses, each of which has an amplitude corresponding to the amplitude of the original video waveform A or B at a precise point in time.

Figure 6:
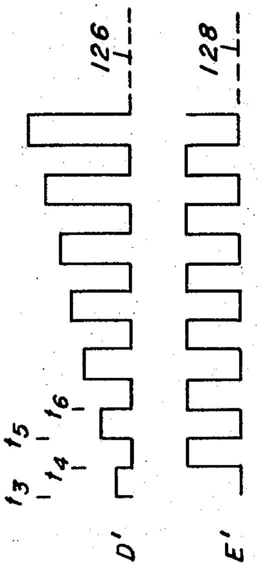
FIG. 6 illustrates expanded waveforms appearing at various points in the circuits of FIGS. 1 and 3.

Waveforms D and E of FIG. 5 are shown on an expanded time scale as waveforms D' n d E' in FIG. 6. It will be noted that the pulses in waveform D' are essentially 180° out of phase with those in waveform E' T aking, first, waveform D' it may be applied to the cathode of diode 66' of demodulator 110 shown in FIG. 4. At time $t_3$ in FIG. 6, it will be assumed that the pulse from bistable multivibrator 120 applied to resistor 56' is positive, while that applied to resistor 58' is negative. Consequently, diodes 60' and 66' are biased in the forward direction whereas diodes 62' and 68' are biased in the direction and, hence, blocked. Under these circumstances, a pulse will appear in waveform D' between times $t_3$ and $t_4$, this pulse being proportional in amplitude to the instantaneous amplitude of the original video waveform A (FIG. 5) at this time. At time $t_5$, the polarities of the pulses applied to resistors 56' and 58' will reverse, whereupon diodes 60' and 66' will be blocked while diodes 62′ and 68′ will conduct. Under these circumstances, a voltage will be applied to the base of transistor 64′ determined by the setting of variable resistor 124. The resistor 124, in effect, determines the black level of the resultant video signal; and this level is represented by the line 126 in FIG. 6. At time $t_5$, the polarities of the pulses applied to resistors 56′ and 58′ are again reversed, whereupon a pulse appears in waveform D′ between times $t_5$ and $t_6$, which pulse has an instantaneous amplitude proportional to the amplitude of the original video waveform A at this time.

The operation of the demodulator 112 is the same as demodulator 110. However, the polarities of the pulses applied to resistors 56′ and 58′ in demodulator 112 are always 180° out of phase with the corresponding pulses applied to resistors 56′ and 58′ in demodulator 110. Consequently, between times $t_3$ and $t_4$, the demodulated or pulsed video waveform E′ will be at the black level 128. Between times $t_4$ and $t_5$ when the waveform $D_S$ at the black level, the diodes 60′ and 66′ in demodulator 112 are biased in the forward direction whereby a pulse will appear in waveform E′, this pulse having an amplitude proportional to the instantaneous amplitude of the original video waveform B. Since the amplitude of the waveform B under the conditions assumed has a constant amplitude, the pulses in waveform E′ also have a constant amplitude.

The demodulated, pulsed video signals D and E of FIG. 5 are applied through amplifiers 130 and 132 to separate television receivers 134 and 136, respectively, However, before they are applied through the amplifiers and receivers, sync pulses from sync pulse separator 100 are applied to both of the waveforms D′ and E′ via leads 135 and 137 respectively.

Figure 7:
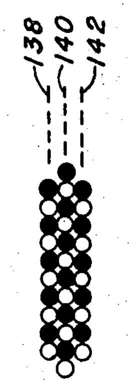
FIG. 7 illustrates the manner in which the time-shared multiplex signals are displayed on the face of a television receiving tube.

From the foregoing, it will be appreciated that essentially one-half of each video waveform A or B is lost in the time-sharing multiplex process. That is, the pulses in waveforms D and E having an amplitude proportional to the original video waveform persist for only approximately one-half the total time of the horizontal sweep cycle. It might be expected, therefore, that the resolution of the resultant video picture would suffer. However, due to the fact that in conventional television-receiving systems interlacing techniques are employed, the resolution does not materially suffer. This is shown, for example, in FIG. 7 wherein alternate horizontal sweeps of the electron beam are identified by the reference numerals 138, 140 and 142.

As is shown, when the electron beam sweeps across the face of a television receiving tube, it does not scan each line in sequence. Rather, it scans alternate lines and thereafter, in a succeeding vertical sweep, scans the remaining horizontal lines. Thus, during one vertical sweep, lines 138 and 142 will be scanned; whereas, during the succeeding vertical sweep, the line 140 between lines 138 and 142 will be scanned. Furthermore, during the second horizontal scan, the video wave shape is slightly displaced in phase with respect to the scan which occurs across lines 138 and 142, for example. The pulses in waveform D or E are represented by the white dots in FIG. 7, while the time between the pulses is represented by the black dots. It can be seen that the white and black dots are aligned in lines 138 and 142. The white and black dots in line 140, however, are intermediate those in lines 138 and 142. Thus, the black dots (i.e., absence of video signal) will not produce vertical lines on the face of the television receiving tube as would be the case, for example, if all of the black and white dots were aligned in vertical rows. Furthermore, the loss of part of the original video signal does not materially impair the resolution of the resulting picture because of the aforesaid interlacing technique.

Although the invention has been shown in connection with a certain specific embodiment, it will be readily apparent to those skilled in the art that various changes in form and arrangement of parts may be made to suit requirements without departing from the spirit and scope of the invention. In this respect, it will be understood that while the system has been described herein primarily in connection with transmission of signals over relatively short cables, the invention also finds utility in transmitting a plurality of signals over telephone lines, microwave transmission systems and the like.

We claim:

1. In combination, first camera means for generating a first television video signal, second camera means for generating a second television video signal, means for time division multiplexing said first and second video signals to produce a composite pulsed multiplexed signal wherein alternate pulses represent samples of the first and second video signals, means for transmitting said composite multiplexed signal to a remote location on a single carrier medium, and means at said remote location for separating those pulses in the multiplexed signal representing samples of the first video signal from those representing the second video signal, said means at said remote location for separating pulses in the multiplexed signal comprising a pair of demodulators, each demodulator comprising a pair of diodes having their cathodes interconnected, means for applying square wave signals 180° out of phase with respect to each other to the anodes of the respective diodes in said first pair, a second pair of diodes having their respective anodes connected to the anodes of the first pair of diodes, means for applying the multiplexed signal to the cathode of one of said diodes, and means for applying a fixed voltage to the other cathode of said second pair of diodes.

2. The combination of claim 1 wherein the multiplexed signal has a blanking pulse at the beginning of each horizontal scanning cycle, including means for superimposing on the blanking pulse a burst of high frequency radio energy, the means at said remote location for separating pulses in the multiplexed signal including a local keyed oscillator, and apparatus responsive to said burst of high frequency energy for driving said local oscillator at a frequency corresponding to the frequency of said burst of high frequency radio energy.

3. The combination of claim 2 including means inductively coupled to the output of said multiplexing means for superimposing a sync pulse on the composite multiplexed pulse.

4. The combination of claim 1 wherein the first and second television video signals are black and white video signals and the burst of high frequency radio energy has a frequency of about 3.58 megacycles.

5. The combination of claim 1 and including means for clamping the sync pulses of the first and second video signals at a common voltage level before they are multiplexed in said multiplexing means.

6. The combination of claim 1 wherein the multiplexing means comprises a first pair of multiplexing diodes having their cathodes interconnected, means for applying square wave signals 180° out of phase with respect to each other to the anodes of the respective multiplexing diodes, a second pair of multiplexing diodes having their respective anodes connected to the anodes of the first pair of multiplexing diodes, and means for applying said first and second television video signals to the cathodes of said second pair of multiplexing diodes.